E. Perry,
Centrifugal Pump.
No. 3,025 Reissued July 7, 1868.
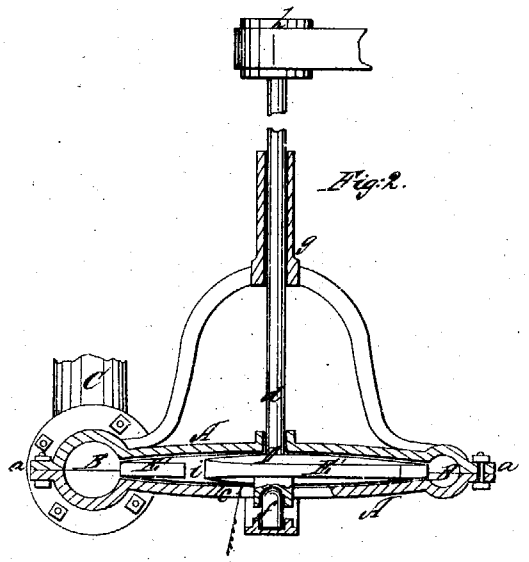
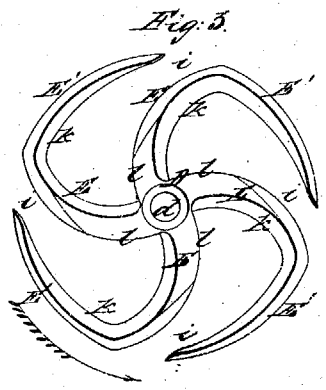
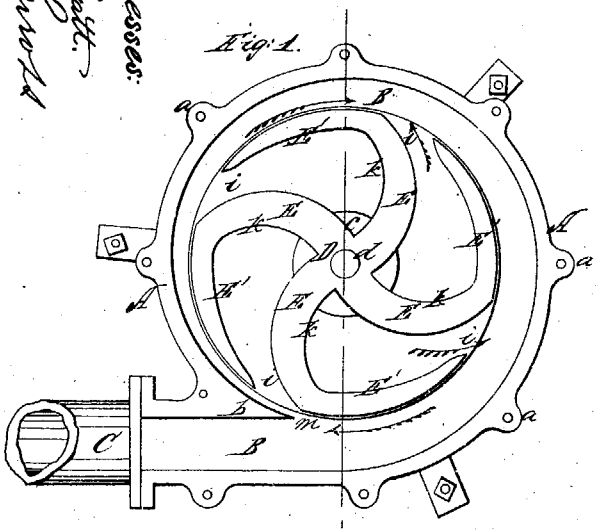
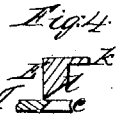
Witnesses:
Jay Hyatt.
A. Serrott
Inventor:
E. Perry
By J. Frank Ville,
Attyp.

United States Patent Office.

ELI PERRY, OF BALDWINSVILLE, NEW YORK.

*Letters Patent No.* 44,337, *dated September* 20, 1864; *reissue No.* 3,025, *dated July* 7, 1868.

IMPROVEMENT IN PUMPS.

The Schedule referred to in these Letters Patent and making part of the same.

TO ALL WHOM IT MAY CONCERN:

Be it known that I, ELI PERRY, of Baldwinsville, in the county of Onondaga, and State of New York, did invent certain new and useful Improvements in Centrifugal-Pumps; and I do hereby declare that the following is a full and exact description thereof, reference being had to the accompanying drawings, making part of this specification Figure 1 is a plan, with the top plate of the case removed, for the purpose of showing the interior arrangement.

Figure 2, a central vertical section.

Figure 3, a bottom view of the piston, opposite to the view of the same in fig. 1.

Figure 4, a diagram showing a cross-section of one of the wings of the piston and a portion of the case.

Like letters of reference indicate corresponding parts in all the figures.

This invention consists in the employment of concentric extensions to the piston-wings, serving to separate the spiral discharge-passage or scroll from the interior of the case, so that the liquid thrown out cannot return again; it also consists in the special arrangement of parts hereinafter set forth.

The case A is of usual form, consisting of two halves, that are fastened together by bolts *a a*, and provided with a circular scroll or discharge-passage, B, that gradually enlarges from the butment *b* around to the eduction-pipe C, where the liquid escapes. The liquid enters the case by an induction-opening, *c*, in the bottom.

Between the two halves of the case is situated a piston, D, whose spindle or shaft *d* rests on a suitable step, *f*, at the bottom, and passes up through a bearing, *g*, and has a suitable pulley, *h*, driven by a band at the top, or some equivalent arrangement.

This piston is of peculiar construction. It has several wings, E E, extending outward from the spindle, and curving in the direction opposite to their motion. At their outer ends, rims or arms E′ E are arranged concentric with the spindle, and respectively reach backward sufficiently near to the wings in the rear to leave only passages *i i*, of proper capacity for the escape of water outwardly. The arms E′ E′ reach to the inner periphery of the scroll B, and they fill the vertical space between the two halves of the case at that point in such a manner as to separate the centre of the case from the scroll, as shown most clearly in fig. 2.

The wings, at their upper surface, are preferably provided with flanges or ribs, *k k*, of greater width than the wings proper themselves, in order to give additional strength. Where, however, the power applied is light, these flanges may be dispensed with.

The lower inner edges, *l l*, of the wings, that move over the edge of the induction-opening *c*, in the bottom of the case, are also preferably made sharp-edged, as shown in figs. 3 and 4, for the purpose of cutting or chopping such sticks or other foreign matter as enter the pump. To prevent obstruction, a space, *m*, is also left between the outer end of the wings (when the same come in position) and the butment *b*, fig. 1.

The liquid, as it enters the opening *c*, is rapidly forced outward by the curved wings, through the passages *i i*, into the scroll, where it is carried upward through the eduction-pipe by the centrifugal action.

The arms E′ E′, by fitting closely between the two plates of the case, and by extending around concentrically with the spindle, in such a manner as to separate the scroll or passage B from the centre of the case, except through the passages *i i*, shut off the water that is thrown out into said scroll, and prevent any return of it again inside; in other words, the water situated in the scroll, outside the arms, is held and carried round there, without possibility of escape back again. This is of the greatest importance, for it equalizes the pressure in the whole scroll, thus producing a more regular and uniform stream, and increasing the discharge.

On public works, it is frequently the case that stones, the size of a man's fist, are carried through the pump. Were it not for the arms E′ E′, these stones would frequently obstruct the pump, by being carried around within the narrow space between the extremities of the dishing portion of the case; but in this device, when such bodies are once thrown outside the arms, there is no possibility of return, and no escape except through the eduction-pipe. This is also true of the sediment in breweries; the curved form of the wings insures the same being carried into the scroll, and when once there, the arms retain it.

In addition to this effect of keeping the pump unobstructed, the sharp edges *l l*, passing in proximity to the bottom of the case A, serve to cut off all sticks, strings, shavings, &c., that enter, into small pieces, that pass easily through. In breweries, especially, there are many such substances mixed with the liquid, which, from their great length, are subject to become wound around the wings. By my device, all difficulties of this kind are obviated.

The flanges *k k* strengthen the wings in such a manner that they are enabled to sustain the great strain to which they are subject. For some uses, such, for instance, as employing in docks, a power of eight or ten-horse is applied, and the stream thrown is a foot or a foot and a half in diameter. In such cases, in order to make cast-iron wings sufficiently strong, these flanges are necessary.

What I claim, and desire to secure by Letters Patent, is—

1. The combination, with the wings E, of the concentric arms or extensions E′, forming a division between the discharge-space B and the interior of the case, except through passages *i*, in the manner and for the purpose specified.

2. The combination, with the wings E and extensions E′, of the flanges *k*, in the manner and for the purpose specified.

3. The under side of the wings, formed with sharp edges *l l*, the same being used in combination with the floor of the case A, substantially as described.

ELI PERRY.

Witnesses:
N. M. WHITE,
D M. NICHOLS.